A. W. FERNANS.
TRAFFIC SIGNAL FOR AUTOMOBILES.
APPLICATION FILED NOV. 3, 1920.
1,368,915.
Patented Feb. 15, 1921.
3 SHEETS—SHEET 1.
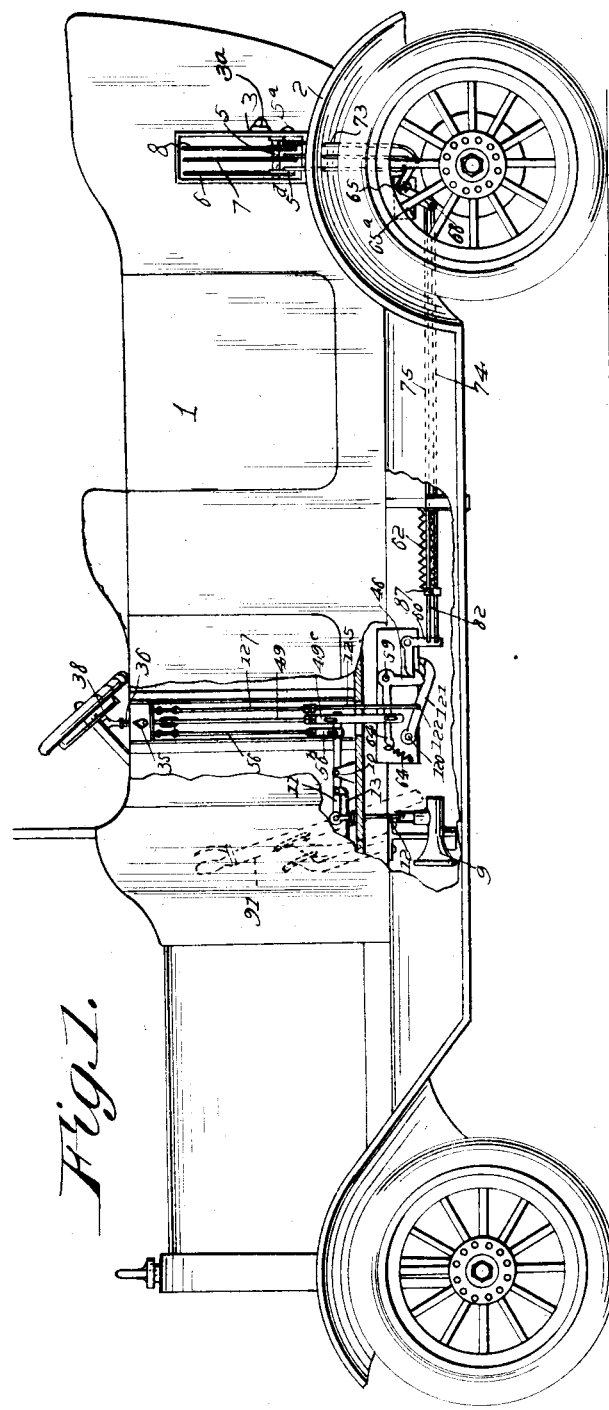
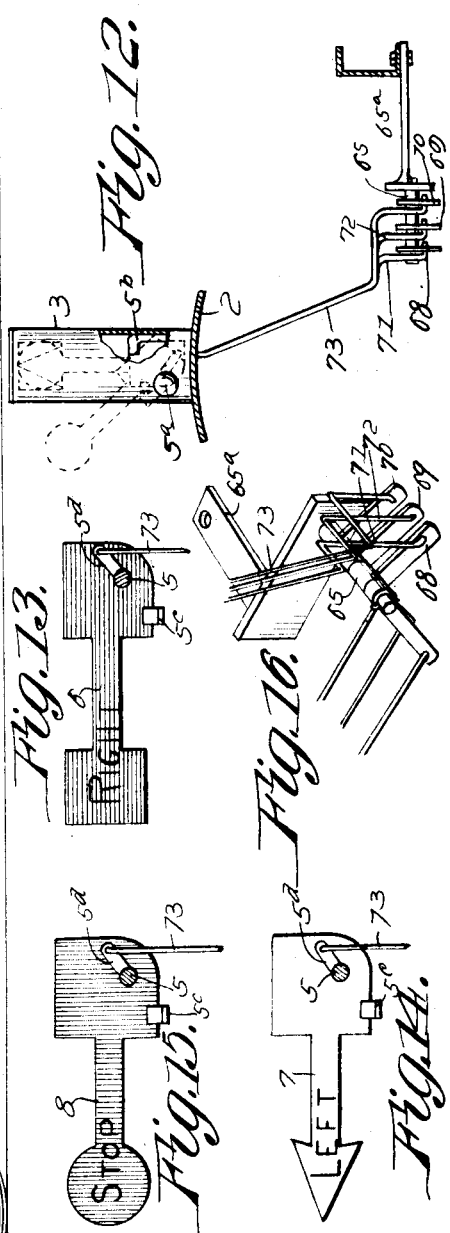
Inventor
Anthony W. Fernans,
By Watson E. Coleman
Attorney A. W. FERNANS.
TRAFFIC SIGNAL FOR AUTOMOBILES.
APPLICATION FILED NOV. 3, 1920.
1,368,915.
Patented Feb. 15, 1921.
3 SHEETS—SHEET 2.
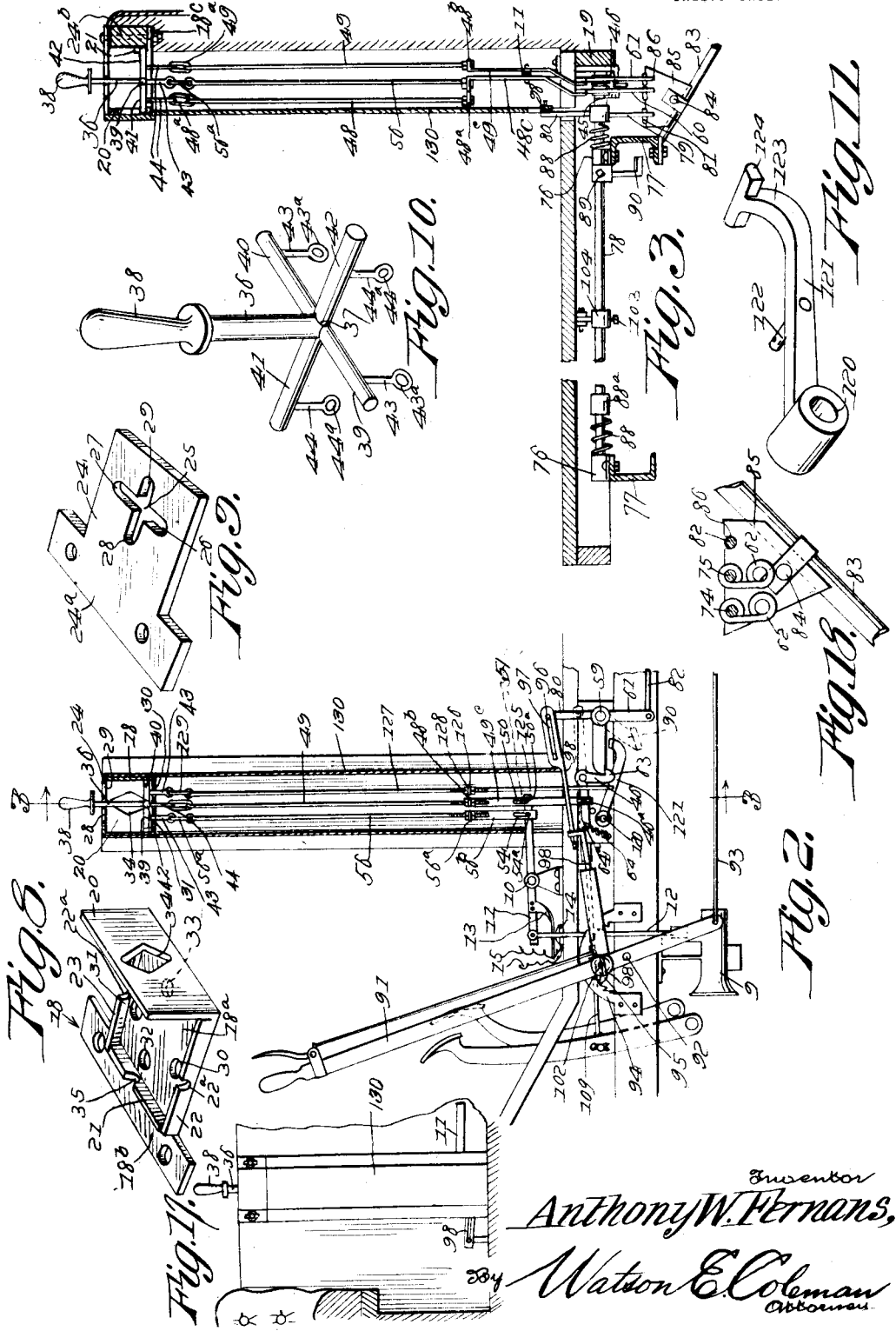

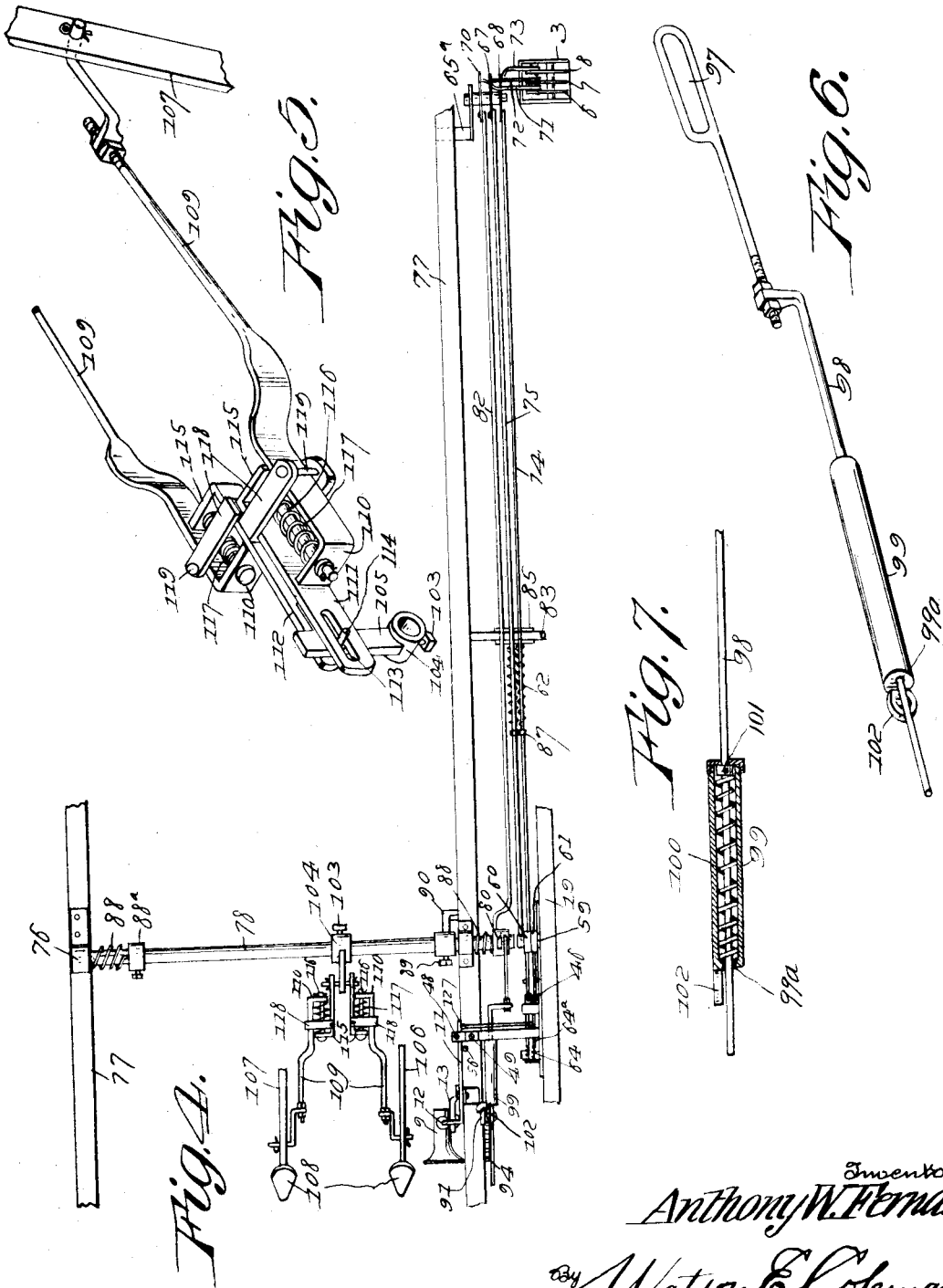

UNITED STATES PATENT OFFICE.

ANTHONY W. FERNANS, OF PAWTUCKET, RHODE ISLAND.

TRAFFIC-SIGNAL FOR AUTOMOBILES.

1,368,915.  Specification of Letters Patent.  Patented Feb. 15, 1921.

Application filed November 3, 1920. Serial No. 421,533.

*To all whom it may concern:*

Be it known that I, ANTHONY W. FERNANS, a citizen of the United States, residing at Pawtucket, in the county of Providence and State of Rhode Island, have invented certain new and useful Improvements in Traffic-Signals for Automobiles, of which the following is a specification, reference being had to the accompanying drawings.

It is the aim of the present invention to provide a traffic signal especially adapted for use in connection with automobiles, and wherein signal blades are afforded, to indicate to an operator of an automobile at the rear, whether the chauffeur of the automobile in front intends to turn either to the right or the left, or to display a red or danger signal blade to indicate the intention of stopping or to indicate the intention to go forward.

As a purpose of the invention it is the aim to improve and render more practical the traffic signal set forth, illustrated and claimed in the Patent No. 1,338,430, dated April 27, 1920, and issued to Anthony W. Fernans.

As another purpose, it is the aim to provide a mechanism for operating the traffic signals, and means connecting said mechanism and the audible signal, whereby both may be operated simultaneously, so that pedestrians may be notified which direction the automobile will take, there being a single controlling lever for operating said mechanism and the connecting means at the same time.

As a further purpose of the invention embodies a red stop or danger signal operable by either the neutral pedal or brake pedal of the automobile, or both in order to indicate danger or the intention of stopping to the chauffeur of the rear automobile.

As a still further purpose, it is the aim to provide means operable by the emergency brake, and so operatively connected with the red or danger signal and hold the red or danger signal displayed, said means being adapted to return the neutral pedal to high gear, and the signal to its initial position.

The invention also aims to provide means forming a part of the connections between the neutral pedal and the red or danger signal, so that when the danger signal is displayed, the neutral pedal may be moved into low gear, without effecting the danger signal, it being a further aim that when the neutral pedal is returned to high gear, the danger signal may be returned to its position.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a conventional form of automobile, showing the improved traffic signals as applied and constructed in accordance with the invention.

Fig. 2 is an enlarged view in elevation of the mechanism for operating the traffic signals, showing the housing for the controlling lever in section, also the housing for the connections between the controlling lever and mechanism in section.

Fig. 3 is a sectional view on line 3—3 of Fig. 2.

Fig. 4 is a fragmentary view of a portion of the automobile frame or chassis, showing the application of the traffic signal constructed in accordance with the invention.

Fig. 5 is a detail perspective view of the connections between the neutral and brake pedals.

Fig. 6 is a perspective view of the connection between the emergency brake lever and the operating means for the red or danger signal.

Fig. 7 is a sectional view longitudinally through the connection shown in Fig. 6.

Fig. 8 is a detail perspective view of the lower section of the housing, which is supported upon the side of the automobile, for the support and mounting of the controlling lever.

Fig. 9 is a perspective view of the top plate or section of the said housing shown in Fig. 8.

Fig. 10 is a detail perspective view of the controlling lever.

Fig. 11 is a detail perspective view of the lever 85, which acts to return the right and left signals to their initial positions.

Fig. 12 is an enlarged detail view of the signal housing and the signals therein, holding the operating means therefor.

Fig. 13 is a detail view of the right signal.

Fig. 14 is a detail view of the left signal.

Fig. 15 is a detail view of the red, stop or danger signal.

Fig. 16 is a detail view of the bell crank levers 68, 69, and 70.

Fig. 17 is a detail view of a portion of an automobile showing the housing for the controlling lever.

Fig. 18 is a detail view of the bracket arm 83 and the plate 85, showing the springs 62.

Referring to the drawings, 1 designates a conventional form of an automobile, to the upper portion of one of the rear mud guards 2 of which the signal blade housing 3 is connected. This housing is constructed preferably as shown, though not necessarily, and pivotally mounted in the housing on the pin or shaft 5 is a plurality of direction indicators or signals 6, 7 and 8. The direction indicators or signals 6 and 7 are colored blue and white respectively, indicating right and left, the former having a rectangular end portion, and the latter an arrow shaped end head portion. The indicator 8 is colored red and has printed thereon the word Stop, therefore indicating danger, namely either that the chauffeur of the automobile is to apply the brakes, or that it is the intention of slowing down, or that the brakes have been applied. The shaft or pin 5 has mounted thereon a plurality of collars $5^a$, for holding the various signals spaced. The bases of the various signal blades, right, left and danger are of rectangular shape, and it is to be noted that the shaft or pin 5 passes through these rectangular base portions eccentrically thereto, so that when the signal blades are in their normal positions within the signal housing, they are so balanced as to assist in holding the blades in position. However, secured to the back of the housing are clips $5^b$, between the arms of which the blades engage, when the blades are in their initial positions. The rectangular bases of the blades have certain of their edge portions provided with supports or cushions $5^c$, which act to support the blades, when moved to positions extending laterally from the signal housing. Carried by the bases of the blades are arms $5^d$, which are also carried by the pin or shaft 5, and to which the connections are made, for tilting the signals or indicators.

Any suitable signal horn 9 is carried by the chassis of the automobile. This horn is of a mechanical construction, for producing an audible signal, and it is to be understood that an electrical horn (not shown) may also be used. These two audible signals are designed to produce the audible signal at approximately the same time when either one of the right and left indicators is displayed, or independently thereof, and when the neutral or brake pedals are operated either singly or together, the danger, red or stop signal may be displayed. However, it may not be necessary to operate the audible signal at such time, and if the operation of the audible signal is desired, it can be accomplished without operating the indicators or signals.

Pivotally mounted on the floor of the automobile as at 10 is a lever 11 provided with a rod 12, which is connected to and operates the audible signal horn 9. A flat steel spring arm 13 is carried by the lever 11, and is designed to engage a push button 14, which is designed to be connected to an electric horn (not shown) by the wires or leads 15. It will be noted that when the lever 11 is tilted on its pivot, the arm 13 will bear upon the push button and thereby close an electric circuit (not shown) for actuating the electric audible signal. The audible signals may be arranged in any suitable location on the car, preferably as shown.

Mounted in any suitable manner on the inner face of the body of the automobile adjacent the upper edge thereof is a boxing or housing 18. This housing comprises a lower section $18^a$, which has an outer wall 20 and an inner flange 21, and rear and forward flanges 22 and 23. The lower section of the housing 18 has an extension plate $18^b$ which is secured to the under portion of the upper rail of the left hand side of the automobile as shown at $18^c$. The housing or boxing 18 includes the upper section 24, which engages upon the upper edge of the outer wall 20, and upon the upper edge of the upper rail of the left hand side of the automobile. The extension $24^a$ of the upper section or cover 24 has openings to receive means to secure the cover or upper section in the upper face of the upper rail of the side of the automobile body as shown at $24^b$. The upper section or cover 24 has an opening 25, which includes rear and forward extension slots 26 and 27, and lateral extension slots 28 and 29. The bottom of the housing or boxing 18 is provided with a plurality of circular openings 30, 31, 32 and 33. These openings 30 to 33 inclusive are positioned axially alined with the extension slots 26 to 29 inclusive. The outer wall 20 of the lower section of the housing is provided with an elongated elliptical opening 34, while the inner flange 21 has a circular bearing 35.

An operating controlling lever 36 is mounted in the housing or boxing, and it comprises a base portion 37 and a handle 38. Projecting from the base portion 37 is a plurality of forward, rear and side arms 39, 40, 41 and 42. The forward and rear arms 39 and 40 have downwardly projecting extensions 43 having eyes 43ª. The lateral arms 41 and 42 have downward projecting extensions 44 having eyes 44ª. The extensions 43 engage through the forward and rear openings 30 and 31 of the lower section or bottom of the housing 18.

The lateral projecting arm 41 of the controlling lever engages the elliptical or diamond shaped opening 34 of the wall 20, while the projecting arm 42 engages the semi-circular bearing 35 of the inner flange 21.

Referring to Fig. 8 of the drawings, it will be noted that flanges 22 and 23 are provided with similar circular bearings 22ª, which are engaged by the forwardly and rearwardly extending arms 39 and 40. By this construction the operating and controlling lever is held in an upright position. Furthermore it will be noted that the operating or controlling lever is capable of being rocked either forwardly, rearwardly or laterally in either direction, for the reason that the handle 39 can move into either one of the extension slots 26, 27, 28 and 29.

The slot or opening 34 is elongated, but owing to the provision of the semi-circular bearing 35, the arms 41 and 42 are permitted to have play when the operating or controlling lever is moved laterally in either direction.

Pivoted to the inside face of the left hand wood rail 19 of the automobile frame is a pair of bell crank levers 45 and 46. Connected to the eyes 44ª of the extension 44 of the arms 41 and 42 are links 48ª and 49ª, to which the rods 48 and 49 are connected. The lower ends of the rods 48 and 49 have their lower ends connected to the right angle ends 48ᵇ of the extension straps or bars 48ᶜ and 49ᶜ, which have slots 50 and 51, which are engaged by the lateral pin 50ª of the lever 11, so that when the controlling or operating lever 36 is moved to actuate either one of the right and left signals, the lever 11 may be tilted and operate the audible signals or horns. The lower ends of the bars or straps 48ᶜ and 49ᶜ have slot and pin connections 46ª with the bell crank levers 45 and 46. A rod 56 is operatively connected to the eye 43ª of the extension 43, which is carried by the arm 39, by means of the link 56ª. The lower end of the rod 56 is connected to the right angle portion 56ª of a strap or bar 56ᵇ, the lower end of which has a slot 54, which is engaged by a lateral pin 54ª of the lever 11. When the operating or controlling lever 36 is moved rearwardly or laterally in either direction, the lever 11 will be oscillated, which in turn will operate the signal horn. It is obvious that when the controlling lever is moved rearwardly without operating either one of the signals at the rear of the automobile, the lever 11 will be tilted upon its pivot, resulting in the actuation of the audible signals.

Also pivoted to the inner face of the left hand side wood rail as at 59 is a pair of bell crank levers 60 and 61, which are under tension of the springs 62, so as to hold certain of their arms in engagement with the notches 63 of the depending arms of the bell crank levers 45 and 46, thereby holding the bell crank levers 45 and 46 set. Suitable springs 64 are connected to the hooks 64ª of the bell crank levers 45 and 46, and are in turn connected to the wood rail, thereby holding the notches 63 normally in engagement with the horizontal arms of the bell crank levers 60 and 61.

Pivotally mounted upon a pivoted shaft 65 (which is carried by a bracket 65ª projecting from the side of the rear part of the chassis) is a plurality of levers 68, 69 and 70. Certain of the arms of these levers are connected to the links 71, 72 and 73, which are in turn connected to the arms 5ᵈ respectively of the right and left and danger signals or indicators 6, 7 and 8. Connecting rods or links 74 and 75 are connected pivotally to certain other arms of the levers 68 and 69, and these links or rods 74 and 75 are in turn pivotally connected to the levers 60 and 61.

Mounted in bearings 76 of the frame or chassis 77 is a rocking shaft 78, and mounted movable with one end thereof is a collar 79 having upwardly and downwardly extending arms 80 and 81. A rod 82 is connected to the downwardly extending arm 81 and is in turn pivotally connected to the bell crank lever 70, so that when the rod 82 is moved rearwardly, the lever 70 will be tilted, thereby displaying the red or danger signal 8.

Connected to one of the foot board supporting brackets 83 (which projects from one side of the chassis) as at 84 is a guide plate 85, in guide grooves or recesses 86 of which the rods 74, 75 and 82 are mounted. It will be noted that the springs 62 are connected at 87 to the rods 74 and 75, and are in turn connected to the guide bracket 85. When the bell crank levers 60 and 61 are released, the action of the springs 62 move the rods 74 and 75 rearwardly, hence operating the right and left direction indicators or signals.

The shaft 78 is rotatable in its bearings, and is under tension of the coiled springs 88 (which are connected to the bearings 76 and the collars 79 and 88ª) so as to hold the arms 80 and 81 substantially perpendicular. Mounted upon and movable with the shaft 78 is a collar 89 having a right angle extending flange 90, the right angle portion of which assumes a position under the upper flange of one side of the chassis, so as to limit the shaft 78 in its movement in one direction, that is to say when the shaft is rocked or rotated to display the danger or red signal.

An emergency brake lever 91 is pivotally mounted at 92 to the chassis of the frame, and connected to its lower end is a rod 93, which in turn is adapted to connect with the usual emergency brake (not shown). A tooth rack or quadrant 94 is carried by the frame of the automobile, and is designed to be engaged by the hand grip operated dog 95, which is carried by the emergency brake lever 91, in order to hold the lever in different positions. Connected to the upper end of the arm 80 by means of a pin 96 is an elongated loop 97 of a rod 98. This rod in turn extends into a cylindrical casing 99, wherein an expansion spring 100 is mounted. This spring cooperates with one end of the cylinder or casing and disk or piston 101, which is carried by the rod 98 and located in the cylinder so as to hold the cylinder and the rod relatively positioned. The casing or cylinder 99 is in turn pivotally connected at 102 to the emergency brake lever 91. By this construction it is obvious that a yieldable connection is afforded between the arm 80 and the emergency brake lever, thereby relieving the strain on various parts when in operation.

One end of the cylinder 99 has an opening 99$^a$ for the reception of the rod 98, to actuate the rod in its movement, and also in order to compress the spring 100 in case the hole connection is not, when applied, properly adjusted.

Secured to the shaft 78 by means of a set-screw 103 is a collar 104 having an arm 105. The usual neutral and brake pedals 106 and 107 are provided with foot engaging pieces 108. Connected to the levers 106 and 107 are coupling links 109, the rear portions of which are flattened and the terminals of these flat portions have right angle parts 110. Link bars 111 and 112 are connected to the arm 105 of the collar 104 by means of the slots 113 and pin 114. The forward end of the link bars 111 and 112 terminate in lateral parts 115. It will be noted that the parts 115 extend outwardly, while the parts 110 extend inwardly toward each other. These parts are oppositely opposed, and passing therethrough are bolts 116. In surrounding relation with the bolt 116 are coiled springs 117, which are interposed between the opposed parts 110 and 115. By this construction the yieldable connections are afforded between the neutral and brake pedals, in order to afford a looseness of play when operating the neutral pedal or the brake pedal. For instance when operating the neutral pedal from neutral position to low gear, and thereby actuating the danger signal, the pulling on the parts is yieldable instead of rigid. U-shaped straps 118 are carried by the link bars 111 and 112 and overlie the flat portions of the link rods 109, there being bolts 119 holding the U-shaped members in place.

Pivotally mounted at 120 on the wood rail is a lever 121, which has a lateral pin 122. The end of the lever 121 has an upturned portion 123, which terminates in a cross-piece 124. The rod 125 is pivotally mounted upon the pin 122, and its upper end terminates in a rectangular flat portion 126, to which a rod 127 is connected adjustably by the nuts 128, whereby the two rods 125 and 127 may be adjusted relatively to each other. The upper end of the rod 127 is connected to a link 129 which is in turn connected to the eye 43$^a$ of the extension 43 of the arm 40, which is carried by the controlling lever piece 37. It will be noted that when the controlling lever 36 is moved to the right, the arms 39 and 40 will rock in the bearings 22$^a$ of the flanges 22, and will raise or tilt the arm 42 upwardly, thereby pulling upon the rod 49, thereby tilting the bell crank lever 46, hence releasing the bell crank lever 61, and through the medium of one of the springs 62, the rod 74 will move rearwardly and tilt the bell crank lever 68, which will operate its respective signal or indicator 6, namely the indicator on which the word Right appears on a blue surface, and which is square in outline. When the blue square indicator or signal is displayed, it indicates to the chauffeur of the machine at the rear that the chauffeur of the machine in front intends to turn to the right.

When the operating or controlling lever 36 is moved to the left, a pulling action is imparted upon the rod 48, which will cause an oscillatory movement of the bell crank lever 45 disengaging its notch from contact with the lever 60. Through the medium of the tension of one of the springs 62, a rearward movement is imparted upon the rod 75, so oscillating the lever 69, as to cause the direction indicator or arrow signal colored white with the word Left appearing thereon to be displayed, indicating that the chauffeur of the automobile intends to turn to the left. When the chauffeur intends to turn to the right, the controlling lever is moved or oscillated to the right, causing the direction indicator to indicate that the chauffeur intends to turn to the right; the chauffeur will always push the pulling lever toward the direction to be taken, the white arrow indicating left and the blue square indicating the right. It will be noted that when the controlling lever is moved in either direction, right or left, it will pull upwardly on the lever 11, and actuate the mechanical and electrical horns or audible signals at the same time, as the rod 12 would move downwardly and actuate the mechanical horn, while the flat steel spring arm 13 will press the electric button 14 and close the circuit on the electrical audible signal or horn (not shown).

In order to restore the signals or indicators to their initial positions the controlling lever 36 may be moved forwardly, thereby pulling upon the rod 127, which will move the lever 121 upwardly, and as the cross piece 124 is directly under the horizontal arms of the bell crank lever 60 and 61, either one of the bell crank levers 60 and 61 will be restored in the initial positions in engagement with the notch of the respective levers 45 and 46. When either one of the bell crank levers 60 and 61 is restored to its respective signal or indicator, it will be noted that the audible signals, namely the mechanical horn, or the electric horn (not shown) may be actuated simultaneously, without operating either one of the visual signals or indicators, by moving the controlling lever 36 rearwardly, hence pulling upwardly on the lever 11, causing the rod 12 to move downwardly and the flat steel spring arm 13 to depress the electric button, which will actuate the mechanical and electrical audible signals, as there is sufficient play in the slots of the bars 48ᶜ and 49ᶜ, where they engage with the horizontal arms of the bell crank levers 45 and 46. In fact the controlling lever 36 actuates the same as in the Patent 1,338,430, the same movements being necessary to operate the visual signals or indicators, for indicating right or left, and at the same time sounding the audible signals.

In addition to providing a device for indicating right or left in this case, as well as in the Patent 1,338,430, the present invention also contemplates the provision and operation of a red stop or danger signal or indicator, and one which is operable through the medium of the usual foot pedals, for operating the transmission and the brake, in fact the pedals which in this application are termed neutral and brake pedals. In this application the pedal 106 on the left in Fig. 4 is designed as the neutral pedal, and when it is in a backward position toward the driver's feet, it is high, and when pushed forward as far as it will move is low, and when it is half way between the high and low it is neutral. The pedal 107 is designed for operating the brakes of the automobile.

Assuming the parts are applied to an automobile as herein disclosed, and the automobile is in motion, with the neutral pedal 106 in high gear, and should the chauffeur desire to stop slowly, the left or neutral pedal 106 is pushed into neutral position, which displays the red stop or danger signal or indicator 8, as the part 109 will pull upon the link 112, which in turn will pull upon the pin 114 of the arm 105, thereby rocking the shaft 78 until the stop finger 90 engages under the edge of the frame or chassis of the automobile. At the same time, the transverse pin 114 will slide forward in the slot 113 of the link 111, which is connected to the brake pedal connections. Also the pin or stud 96 at the upper end of the arm 80 will slide forward in the loop 97 of the red signal returning connections 98, that is connections to the emergency brake lever. Then when the chauffeur wishes to start forward again, the neutral pedal 106 is moved still further forward in the low gear, and when so moved, the shaft 78 is not rotated, as it is held against further movement by the stop finger 90 engaging under the chassis. However owing to the neutral pedal connections being in two parts, namely the parts 109 and 112, with a spring or yieldable connection 116 therebetween, the part 109 will move, without moving the part 112. In this way the neutral pedal is allowed to go forward, putting the transmission in the low gear, and allowing the automobile to start forward. After the automobile is under way slowly with the neutral pedal in low gear, the chauffeur then allows the neutral pedal to move back in the high gear, thereby returning the red stop or danger signal to its initial position. When the neutral pedal is in neutral position, or in low gear, the red stop or danger signal remains exposed. However when the neutral pedal is moved into high gear, the red stop or danger signal is returned to its initial position.

When the chauffeur desires to stop suddenly, the neutral pedal 106 is applied from high gear to neutral, and at the same time the right or brake pedal 107 is pushed forward, thereby applying the brakes at the same time the pedal 106 is moved to neutral. Either one of the pedals 106 and 107, or both together may be applied, but it is obvious that both of the pedals must be released, in order to return red stop or danger signal to its initial position.

When the chauffeur wishes to leave the car standing, the neutral pedal is applied to neutral position, and the emergency brake lever 91 is pulled back. This operation holds the neutral pedal into neutral position, besides applying the emergency brake. For instance when the neutral pedal 106 is pushed forward, the shaft 78 is rotated, and the arm 80 is moved, so that the pin or stud 96 will move half way of the slot or loop 97 of the link or rod 98, then when emergency brake lever 91 is moved rearwardly, the forward end of the slot or loop 97 will abut the stud or pin 96, and prevent further movement of the arm 80, and then hold the neutral pedal in neutral position. While the automobile is standing, or when moved rearward into a narrow stall, or when applying a tire, it may be desired to not have the danger or red signal displayed; therefore the present invention includes a returning or locking connection from the emergency brake lever to the stud or pin 96. This returning or locking connection 98 is attached to the emergency brake lever as at 102. The emergency brake lever is at all times in a forward position when the automobile is in motion. As before stated when the automobile is left standing the emergency brake lever is moved rearwardly, which causes the forward end of the slot or loop 97 to contact with the pin or stud 96, thereby preventing the arm 80 from moving forward, hence preventing the red stop or danger signal or indicator 8 from being displayed. When the arm 80 is prevented from movement, the neutral pedal 106 can be moved, owing to the yieldable connections with the arm 105, hence the neutral pedal 106 can be moved to neutral position. As the tension of the spring connections between the neutral pedal and the arm 105 is greatly increased when the neutral pedal is applied to neutral position and the emergency brake lever 91 moved rearward to prevent the forward movement of the pin or stud 96, it is obvious that the red or danger signal cannot be moved to a display position. This operation need not be exercised, unless the chauffeur desires not to display the red stop or danger signal, when standing, or when a tire is being applied, or when backing or moving rearwardly in a narrow space.

When moving the automobile rearwardly the emergency brake lever is always moved forward a trifle, enough only to release the emergency brake, but still enough to hold the neutral pedal in neutral position, and when this is the case the red signal is not quite in its initial or normal position, as it is permitted to project out from the signal casing or box a short distance, and when in such position it is out of the way of all harm.

The springs 88 of the shaft 78 hold the shaft with the red signal in its initial position. The operation of the red stop or danger signal 8 is automatic.

The purpose of the two spaced spring connections for the brake pedal and the neutral pedal, is that when the chauffeur wishes to stop, the neutral pedal is moved to neutral position, in which case the slot connection of the link 112 pulls upon the pin 114 of the arm 105 and turns the shaft 78 forward. This causes the transverse pin 114 on the brake pedal connection to slide forward in the slot 113 of the link 111, and at the same time the pin or stud 96 of the arm 80 will slide forward in the loop or slot 97. The shaft 78 is then being held from rotating any further forward by the stop finger 90. The chauffeur pulls the emergency brake lever rearwardly to hold the neutral pedal in neutral position and also apply the emergency brake. The pin or stud 96 being in a pivot of the forward end of the loop or slot 97 pushes the red stop or danger signal to initial position. The forward end of the slot or loop 97 returns the arm 80 to its normal position, disengaging the stop finger 90 from the chassis, and hence preventing the shaft 78 from being rotated. It is obvious that if the brake pedal connection should be made in one piece, the brake would not be applied, as the pin 114 is at the rear end of the slot 113 of the link 111, thereby preventing the shaft from being rotated; therefore owing to the connections being in two parts as shown and described, the connection may be operated as hereinbefore stated, namely allowing the pedal to move forward to apply the brake, without the shaft turning. It will be noted that a suitable housing 130 is employed to house the connections 48, 49, 56 and 127, as well as closing the forward and rear ends of the boxing or housing 18.

The neutral pedal can always be moved from high to neutral and then from neutral to low, at all times and under all conditions, regardless of the positions of the other parts. If the neutral pedal is in neutral and then the chauffeur pulls the emergency brake lever back, the neutral pedal can even then move forward to low, but it cannot come back to high gear until the chauffeur pushes the emergency lever forward. When the neutral pedal is in neutral and the chauffeur pulls the emergency brake lever back to hold the neutral pedal in such position, which sets the emergency brakes, the neutral pedal is not supposed to move forward to low gear, the machine would be operating and pulling against the emergency brakes, which are set, and therefore the automobile could not move, but nevertheless the neutral pedal can be moved forward to low gear. Carried by the signal housing as shown at 3ª in Fig. 1, an electric lamp is attached, but the electric circuit is not shown. This lamp has nothing to do with the operation of the signals, with the exception that it is used to enable the signals to be seen, when displayed.

The invention having been set forth, what is claimed as being useful is:—

1. In a traffic signal, the combination with right and left direction indicators, of a pair of audible signals, a single lever having means operatively connecting with both audible signals, a manually controlled mechanism operatively connecting with the right and left direction indicators and having a connection with said single lever, whereby upon operating either direction indicator, both audible signals are actuated simultaneously.

2. In a traffic signal, a pair of audible signals, a single rocking lever operatively connecting therewith, right and left direction indicators, manually controlled means having connections with said single rocking lever and the right and left direction indicator, whereby upon operating said mechanism, both audible signals are operated simultaneously prior to the actuation of the direction indicator, said connections including slide rods connected with the direction indicators, a guide carried by a brace bracket between the chassis and the running board for the slide rods, spring means surrounding the slide rods and connecting the guide and the rods to return the direction indicators to their initial position.

3. The combination with right and left direction indicators including a supporting shaft therefor, a red stop or danger signal mounted upon said shaft, means operatively connecting the red stop or danger signal and said neutral and brake pedals, whereby upon application of one or both of said pedals the red stop or danger signal may be actuated to a display position, and an emergency brake lever means for returning the danger signal to its initial position, when the neutral pedal is in a neutral position, thereby preventing the danger signal from being moved to a display position.

4. In combination with right and left direction indicators, including a shaft on which they are mounted, a red stop or danger signal mounted on the shaft, neutral and brake pedals, and means yieldably and operatively connecting the neutral and brake pedals and said red stop or danger signal, whereby upon moving the neutral pedal from high gear to neutral gear the red stop or danger signal may be displayed, the neutral pedal being adapted to move farther forward from neutral to low gear without further moving the danger signal from its display position to its initial position.

5. In combination with right and left direction indicators, including a shaft on which they are mounted, a red stop or danger signal mounted on the shaft, neutral and brake pedals, and means yieldably and operatively connecting the neutral and brake pedals and said red stop or danger signal, whereby upon moving the neutral pedal from high gear to neutral gear the red stop or danger signal may be displayed, the neutral pedal being adapted to move farther forward from neutral to low gear without further moving the danger signal from its display position to its initial position, and means operatively connected to the danger signal for returning it to its initial position while the neutral pedal remains in neutral position.

6. In combinaiton with right and left direction indicators including a shaft on which they are mounted, a red stop or danger signal operable upon said shaft, a neutral pedal, means operatively connecting the neutral pedal and the red stop or danger signal, said means having connections with the brake pedal, either the neutral or brake pedal or both being capable of being applied, so as to display the danger signal, and an emergency brake lever means for returning the danger signal to its initial position when the neutral pedal is in a neutral position, thereby preventing the danger signal from being moved to display position.

7. In a direction indicator including a red stop or danger signal, a neutral pedal, means connecting the neutral pedal and the danger signal, so that when the neutral pedal is moved to a neutral position the danger signal may be exposed, and means permitting the neutral pedal to move to a lower gear position without further operating the first means.

8. In a direction indicator including a red stop or danger signal, a neutral pedal, means connecting the neutral pedal and the danger signal, so that when the neutral pedal is moved to a neutral position the danger signal may be exposed, and means permitting the neutral pedal to move to a low gear position without further operating the first means, and an emergency brake lever operated means for returning the danger signal to its initial position when the neutral pedal is returned to neutral position.

9. In a direction indicator including a red stop or danger signal, a neutral pedal, means connecting the neutral pedal and the danger signal, so that when the neutral pedal is moved to a neutral position the danger signal may be exposed, and means permitting the neutral pedal to move to a low gear position without further operating the first means, an audible signal manually operative and adapted to be operated at the same time the danger signal is moved to an exposed position.

10. In a traffic signal, a danger signal, a housing therefor, a neutral pedal, means operatively connecting said pedal and the danger signal, means coöperating with a part of said connecting means to limit the danger signal in its exposed position, means to permit the connecting means to yield, whereby the neutral pedal may be operated from neutral position to low gear position, without further moving the danger signal.

11. In a traffic signal, a danger signal, a housing therefor, a neutral pedal, means operatively connecting said pedal and the danger signal, means coöperating with a part of said connecting means to limit the danger signal in its exposed position, means to permit the connecting means to yield, whereby the neutral pedal may be operated from neutral position, without further moving the danger signal, and means coöperating with the connecting means to return the danger signal to its initial position, when the neutral pedal is returned to neutral position.

12. In a traffic signal, a red stop or danger signal and an emergency brake lever having loose yieldable connections with the red stop or danger signal for operating the same.

13. In a traffic signal, a red stop or danger signal and an emergency brake lever operatively loosely connected with said red stop or danger signal for operating the same.

14. In a traffic signal, a red stop or danger signal, neutral and brake pedals operatively connecting with said signal, either of said pedals adapted to actuate the signal, and an emergency brake lever connected to the signal and adapted to operate the same without affecting the positions of either of said pedals.

15. In a traffic signal, a red stop or danger signal, neutral and brake pedals operatively connecting with said signal either of said pedals adapted to actuate the signal, and an emergency brake lever connected to the signal and adapted to operate the same without affecting the positions of either of said pedals, the construction and arrangement of the emergency brake lever being such as to return the signal to a normal position in case it has been previously actuated by either one of said pedals.

16. In a traffic signal, a red stop or danger signal, neutral and brake pedals, means connecting said pedals and said red stop or danger signal, the construction and arrangement of said means being such, that upon moving the neutral pedal from high gear to neutral gear the signal may be displayed.

17. In a traffic signal, a red stop or danger signal, neutral and brake pedals, means connecting said pedals and said red stop or danger signal, the construction and arrangement of said means being such, that upon moving the neutral pedal from high gear to neutral gear the signal may be displayed, and upon further movement from neutral to low gear the signal remains stationary in its displayed position.

18. In a traffic signal, a red stop or danger signal, neutral and brake pedals, means connecting said pedals and said red stop or danger signal, the construction and arrangement of said means being such, that upon moving the neutral pedal from high gear to neutral gear the signal may be displayed, and upon further movement from neutral to low gear the signal remains stationary in its displayed position, and an emergency brake lever for restoring said signal to its initial position without affecting positions of the pedals.

In testimony whereof I hereunto affix my signature.

ANTHONY W. FERNANS.